(12) United States Patent
He et al.

(10) Patent No.: US 10,654,418 B2
(45) Date of Patent: May 19, 2020

(54) VEHICLE AND VEHICLE STEP THEREOF

(71) Applicant: WINBO-Dongjian Automotive Technology Co.,Ltd., Foshan, Guangdong Province (CN)

(72) Inventors: Weiting He, Foshan (CN); Guodong Luo, Foshan (CN); Jie Yang, Foshan (CN); Yongbo Chen, Foshan (CN); Qian Chen, Foshan (CN)

(73) Assignee: WINBO-Dongjian Automotive Technology Co., Ltd., Foshan (CN)

( * ) Notice: Subject to any disclaimer, the term of this patent is extended or adjusted under 35 U.S.C. 154(b) by 256 days.

(21) Appl. No.: 15/854,674

(22) Filed: Dec. 26, 2017

(65) Prior Publication Data

US 2018/0339657 A1 Nov. 29, 2018

(30) Foreign Application Priority Data

May 26, 2017 (CN) .......................... 2017 1 0384411

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01)

(58) Field of Classification Search
CPC .. B60R 3/02; B60R 3/00; B60R 3/002; B60R 2011/0092
See application file for complete search history.

(56) References Cited

U.S. PATENT DOCUMENTS

| | | | | |
|---|---|---|---|---|
| 5,312,148 A | * | 5/1994 | Morgan | B60P 1/435 296/61 |
| 6,135,472 A | * | 10/2000 | Wilson | B60R 3/002 280/164.1 |
| 6,270,099 B1 | * | 8/2001 | Farkash | B60R 3/002 182/127 |
| 6,375,207 B1 | * | 4/2002 | Dean | B60R 3/02 182/88 |
| 6,746,033 B1 | * | 6/2004 | McDaniel | B60R 3/02 182/88 |
| 7,017,927 B2 | * | 3/2006 | Henderson | B60R 3/002 280/163 |
| 7,377,563 B1 | * | 5/2008 | Demick | B60R 3/02 280/164.1 |
| 7,607,674 B2 | * | 10/2009 | Watson | B60R 3/02 280/163 |
| 8,079,628 B2 | * | 12/2011 | Micheli | B60P 3/423 296/57.1 |
| 8,590,913 B1 | * | 11/2013 | Oh | B60R 3/02 280/163 |

(Continued)

*Primary Examiner* — James A Shriver, II
*Assistant Examiner* — Vaughn Coolman

(57) ABSTRACT

A vehicle step for a vehicle is provided. The vehicle step includes a bracket, a first step member, a second step member, a first power mechanism and a second power mechanism. The first step member and the second step member are separately mounted on the bracket. The first power mechanism is electrically connected to the first step member and configured to drive the first step member to rotate from a first position to a second position. The second power mechanism is electrically connected to the second step member and configured to drive the second step member to rotate from the first position to the second position.

13 Claims, 4 Drawing Sheets

(56) References Cited

U.S. PATENT DOCUMENTS

| | | | |
|---|---|---|---|
| 8,740,279 B1* | 6/2014 | McGoff | E05B 83/20 296/51 |
| 9,056,583 B2* | 6/2015 | Cha | B60R 3/02 |
| 9,205,781 B1* | 12/2015 | May | B60R 3/02 |
| 9,248,780 B2* | 2/2016 | Greenwood | B60R 3/02 |
| 9,434,317 B2* | 9/2016 | Nania | B60R 19/48 |
| 9,758,104 B2* | 9/2017 | Fichter | B60R 3/00 |
| 9,994,263 B1* | 6/2018 | Richter | B62D 33/0273 |
| 2003/0132595 A1* | 7/2003 | Fabiano | B60R 3/002 280/166 |
| 2004/0207224 A1* | 10/2004 | Miller | B60R 3/02 296/21 |
| 2006/0214386 A1* | 9/2006 | Watson | B60R 3/02 280/163 |
| 2007/0290515 A1* | 12/2007 | Doan | B60R 19/38 293/119 |
| 2008/0106106 A1* | 5/2008 | Lavoie | B60R 3/02 293/117 |
| 2008/0116653 A1* | 5/2008 | Piotrowski | B60R 3/002 280/166 |
| 2008/0179920 A1* | 7/2008 | Watson | B60R 3/002 296/209 |
| 2008/0246244 A1* | 10/2008 | Watson | B60R 3/02 280/166 |
| 2009/0250896 A1* | 10/2009 | Watson | B60R 3/02 280/166 |
| 2010/0011552 A1* | 1/2010 | Kuntze | B60R 3/002 29/11 |
| 2010/0194070 A1* | 8/2010 | Stauffer | B60R 3/002 280/166 |
| 2015/0042060 A1* | 2/2015 | Cha | B60R 3/02 280/166 |
| 2015/0151684 A1* | 6/2015 | Greenwood | B60R 3/02 280/166 |
| 2016/0137134 A1* | 5/2016 | Nania | B60R 19/48 280/164.1 |
| 2017/0036606 A1* | 2/2017 | Du | B60R 3/02 |
| 2017/0190308 A1* | 7/2017 | Smith | B60R 3/02 |
| 2018/0009358 A1* | 1/2018 | Sindoni, Jr. | B60P 1/435 |
| 2018/0297530 A1* | 10/2018 | Stickles | B60R 3/02 |
| 2019/0047477 A1* | 2/2019 | Crandall | B60Q 1/2661 |
| 2019/0152399 A1* | 5/2019 | Smith | B60R 3/02 |

* cited by examiner

VEHICLE AND VEHICLE STEP THEREOF

CROSS REFERENCE TO RELATED APPLICATIONS

This application claims priority to China Patent Application No. 201710384411.9, filed on May 26, 2017, in the State Intellectual Property Office of China, the content of which is hereby incorporated by reference herein as if set forth in its entirety.

TECHNICAL FIELD

The present disclosure relates to vehicle components, and more particularly, to a vehicle step.

BACKGROUND

Many classes of vehicles, such as pick-up trucks, dump trucks, sport utility vehicles (SUVs), Jeeps, and other vehicles, are raised off the ground to an extent that may make it difficult to enter the vehicle cab or access portions of the vehicle. Such vehicles or trucks may be equipped with accessories such as externally mounted side boards, running boards, side bars, or other step assemblies to provide a surface upon which a person may step, or stand when attempting to access the cab or other portion of the vehicle.

DETAILED DESCRIPTION

Hereinbelow, the technical solutions of embodiments of the present disclosure will be described clearly and completely with reference to the attached drawings illustrating the embodiments of the present disclosure. Obviously, the embodiments described herein are only some of the embodiments of the present disclosure but do not represent all embodiments of the disclosure. All other embodiments that can be devised by those of ordinary skill in the art on the basis of the embodiments described herein and without making inventive efforts shall fall within the scope of the present disclosure.

Figure 1:
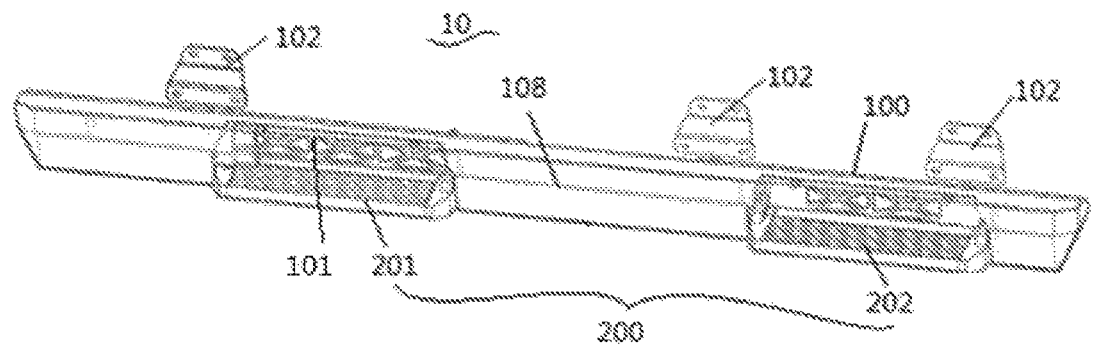
FIG. 1 is an assembled view of a vehicle step according to one embodiment of the present disclosure.

Referring to FIG. 1, a vehicle step 10 according to one embodiment of the present disclosure is shown. The vehicle step 10 may be installed on the any sort of vehicle, such as an open bed or box truck (pick-up), dump truck, SUV, Jeep or any other vehicle whose user may benefit from the addition of a step assembly for stepping into, standing upon or in any way accessing the vehicle or a portion thereof. In one embodiment shown in FIG. 7 and FIG. 8, the vehicle 40 is a pick-up truck having a door. The door may comprise a first door 401 and a second door 402. The vehicle step 10 is installed on the pick-up truck and beneath the door.

Figure 2:
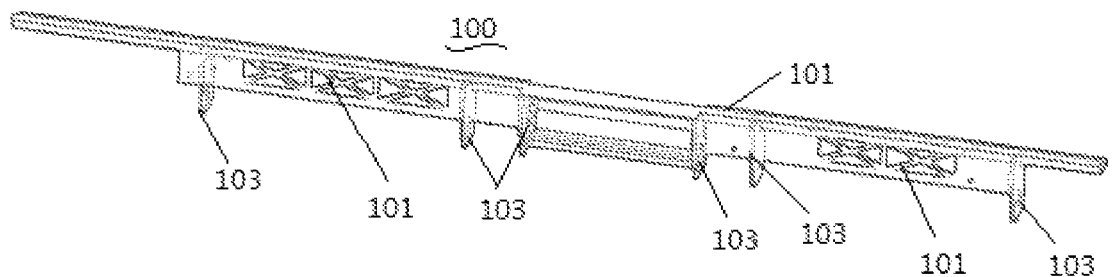
FIG. 2 is a perspective view of a pedal bracket of the vehicle step shown in FIG. 1.
Figure 3:
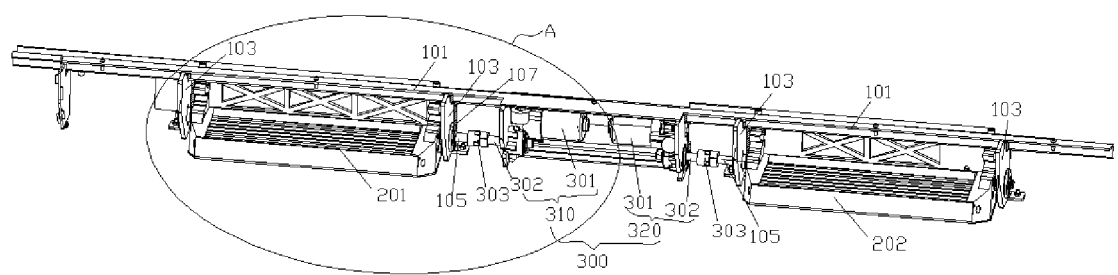
FIG. 3 is a perspective view of two pedal units separately connecting with a power unit according to an embodiment of the present disclosure.

Referring to FIG. 1 to FIG. 3, the vehicle step 10 may comprise a bracket 100 mounted on the door, a step member 200 mounted on the bracket 100 and a power mechanism 300 electrically connected to the step member 200 and configured to drive the step member 200 to rotate from a first position to a second position.

The vehicle step 10 may further comprise a controller (not shown), and a sensor (not shown). The controller may be respectively connected with the sensor and the power mechanism 300. The power mechanism 300 may be connected with the vehicle circuit. The sensor may detect the switch signal of the vehicle door and transfer the detected signal to the controller, then the controller may control the power mechanism 300 according to the door switch signal. The power mechanism 300 may drive the step member 200 to rotate from a retracted position to an extended position, or vice versa.

In one embodiment, the bracket 100 may comprise an elongated bracket body 101, a plurality of tongues 102 extending from one side of the bracket body 101 and a plurality of mounting ears 103 extending from the other side of the bracket body 101. The tongues 102 are configured to mount the bracket 100 to the vehicle. The mounting ears 103 are configured to mount the step member 200 and the power mechanism 300 to the bracket 100. An enclosure 108 is provided to cover the power mechanism 300.

In one embodiment, the step member 200 may comprise a first step member 201 and a second step member 202 separated from the first step member 201. The power mechanism 300 may be located between the first and second step members 201, 202 and comprise a first power mechanism 310 and a second power mechanism 320. The first step member 201 may be electrically connected to the first power mechanism 310. The second step member 202 may be electrically connected to the second power mechanism 320. Each of the first and second step members 201, 202 may be mounted between two adjacent mounting ears 103.

Figure 4:
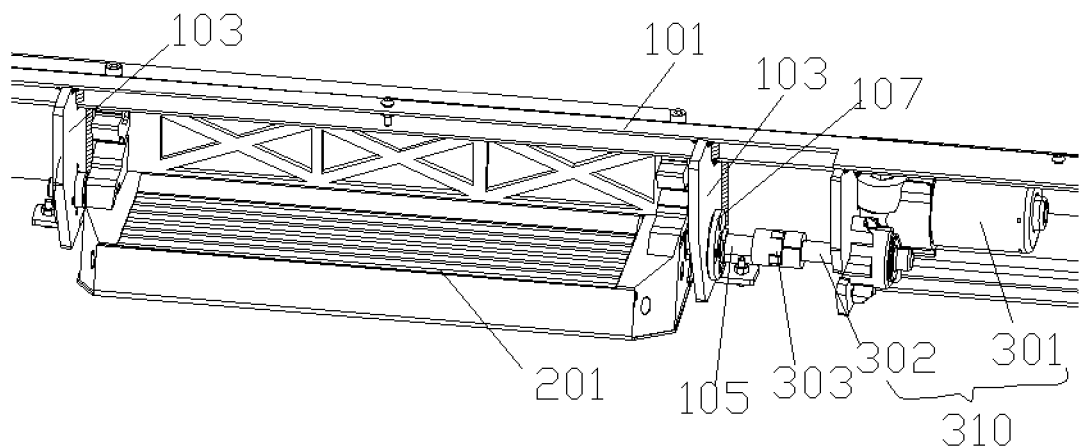
FIG. 4 is an enlarged view of portion A in FIG. 3.
Figure 5:
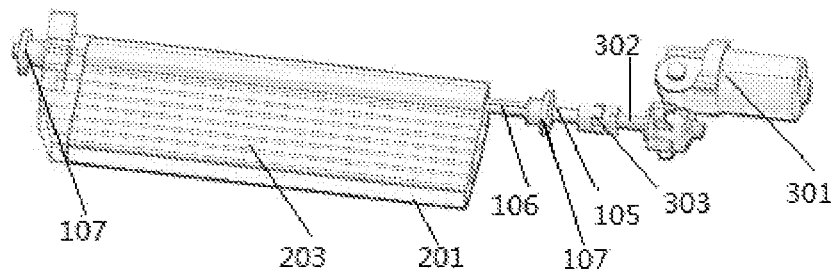
FIG. 5 is an exploded view of a power unit connecting with a pedal body according to an embodiment of the present disclosure.

Referring to FIG. 3, FIG. 4 and FIG. 5, in one embodiment, each of the first and second step members 201, 202 may be mounted on the bracket 100 via a transmission shaft 105 and rotate about the axis of the transmission shaft 105 together with the transmission shaft 105 between the first and second positions. The transmission shaft 105 may comprise a flat key 106 engaged in a shaft hole (not labeled) in each of the first and second step members 201, 202 to fix the flat key 106 relative to each of the first and second step members 201, 202. The transmission shaft 105 may extend through each of the first and second step members 201, 202. A pair of end sockets 107 are provided on each transmission shaft 105 and located on two lateral sides of each of the first and second step members 201, 202 to prevent the transmission shafts 105 from being separated from the first and second step members 201, 202 during rotation.

In some other embodiments, the cross-section of the transmission shaft 105 may be a specific shape, such as triangle, polygon, oval or other irregular shape.

The first and second step members 201, 202 may be provided with a non-slip layer 203 in order to prevent from slipping. An anti-corrosion layer (not shown) may be provided on the surface of the first and second step members 201, 202 and the bracket 100.

Each of the first and second power mechanisms 310, 320 may comprise a motor 301 connected with the transmission shaft 105 and providing power to or movement (e.g., rotation) of the transmission shaft 105. A coupling 303 may be provided to connect the transmission shaft 105 and an output shaft 302 of the motor 301. The motor 301 of each of the first and second power mechanisms 310, 320 may transmit the torque to the transmission shaft 105 via the coupling 303, and the transmission shaft 105 may transmit the torque to each of the first and second step members 201, 202. In one embodiment, the coupling 303 may be a resilient coupling.

Figure 6:
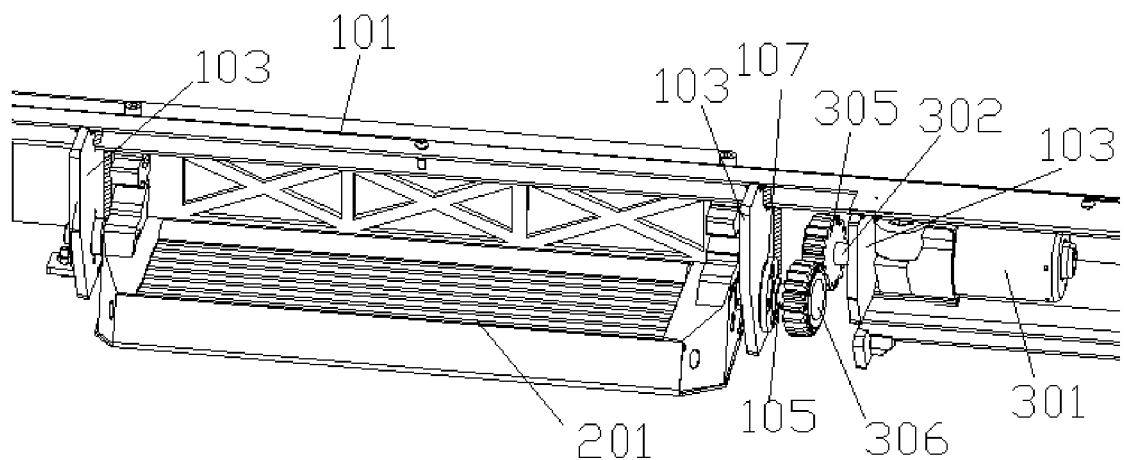
FIG. 6 is a perspective view of a pedal unit separately connecting with a power unit according to another embodiment of the present disclosure.

Referring to FIG. 6, in another embodiment, each of the first and second power mechanisms 310, 320 may comprises a motor 301 connected with the transmission shaft 105 and providing the transmission shaft 105 power. A driving gear 305 is provided on an output shaft 302 of the motor 301. A driven gear 306 engaged with the driving gear 305 is provided on the transmission shaft 105. The motor 301 of each of the first and second power mechanisms 310 and 320 may transmit the torque to the transmission shaft 105 via the driving gear 305 and the driven gear 306. The transmission shaft 105 may transmit the torque to each of the first and second step members 201, 202.

Figure 7:
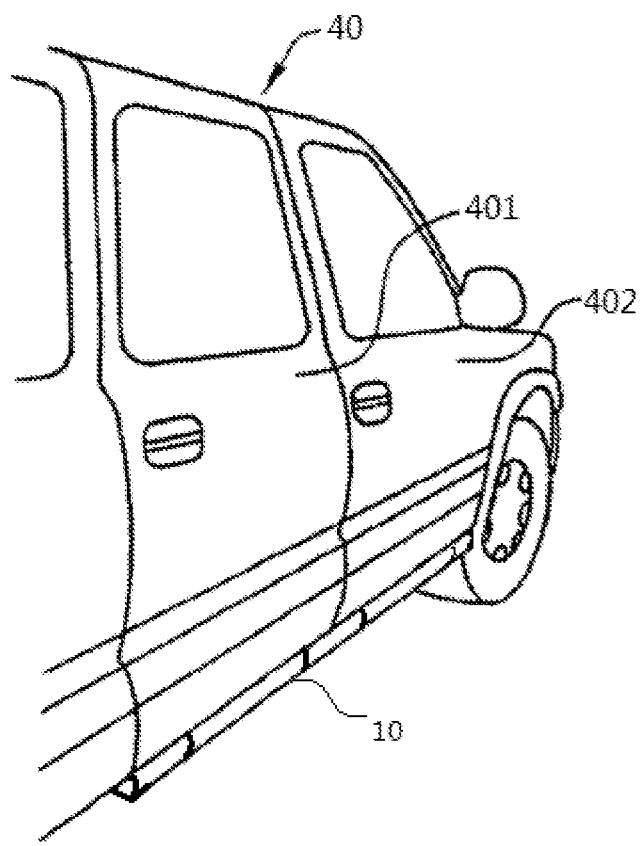
FIG. 7 is a schematic of a vehicle with a retracted vehicle step according to an embodiment of the present disclosure.
Figure 8:
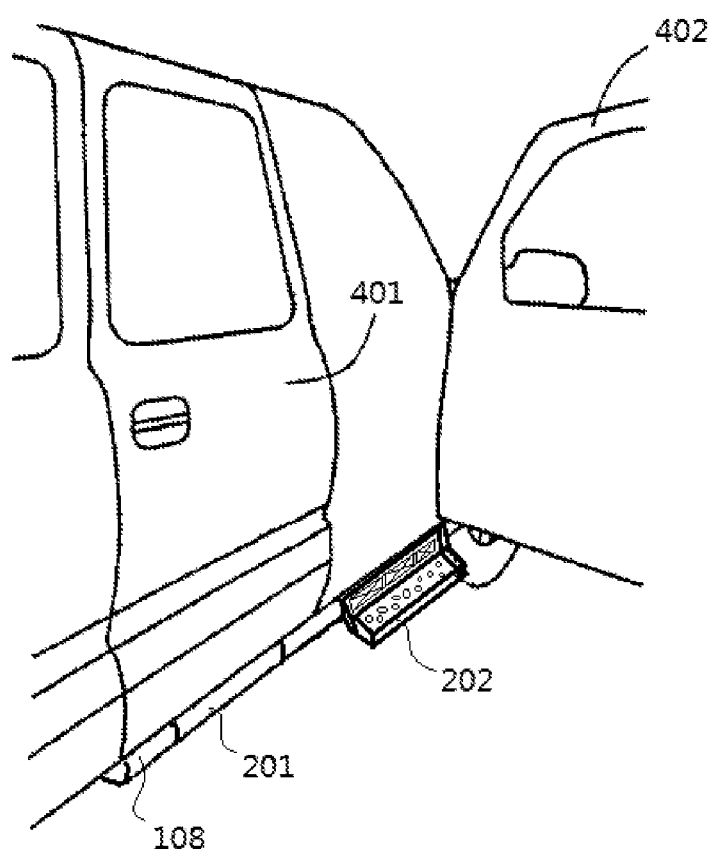
FIG. 8 is a schematic of a vehicle with an extended vehicle step according to an embodiment of the present disclosure.

Referring to FIG. 7 and FIG. 8, the vehicle step 10 is installed on a vehicle 40 via the bracket 100. The vehicle 40 having a first door 401 and a second door 402. The first step member 201 of the vehicle step 10 is installed beneath the first door 401 and the second step member 202 of the vehicle step 10 is installed beneath the second door 402. The first step member 201 and the second step member 202 may be operated separately. The first and second step members 201, 202 are retracted when the vehicle 40 runs with the first and second doors 401, 402 closed. When the vehicle 40 stops with the first door 401 or the second door 402 open, the corresponding first step member 201 or the corresponding second step member 202 is extended separately to provide a surface upon which a person may step or stand when attempting to enter or access the vehicle 40.

The above description depicts merely some exemplary embodiments of the application, but does not mean to limit the scope of the application. Any equivalent structure or flow transformations made to the application, or any direct or indirect applications of the application on other related fields, shall all be covered within the protection of the application.

What is claimed is:

1. A vehicle step, comprising:
   a bracket;
   a first step member and a second step member which are separately mounted on the bracket;
   a first power mechanism electrically connected to the first step member and configured to drive the first step member to rotate from a first position to a second position; and
   a second power mechanism electrically connected to the second step member and configured to drive the second step member to rotate from the first position to the second position;
   wherein the first and second power mechanisms are located adjacent to each other and between the first step members and the second step member such that the first and second mechanism are covered by a same enclosure.

2. The vehicle step of claim 1, wherein each of the first and second step members is mounted on the bracket via a transmission shaft and rotates about an axis of the transmission shaft together with the transmission shaft between the first and second positions.

3. The vehicle step of claim 2, wherein each of the first and second power mechanisms comprises a motor connected with the transmission shaft and configured to provide power to the transmission shaft.

4. The vehicle step of claim 3, wherein the motor comprises an output shaft; a coupling is provided to connect the transmission shaft and the output shaft, the transmission shaft and the output shaft are coaxial.

5. The vehicle step of claim 2, wherein the transmission shaft comprises a flat key extending through and fixed in each of the first and second step members.

6. The vehicle step of claim 2, wherein a pair of end sockets are provided on each transmission shaft and located at two lateral sides of each of the first and second step members.

7. The vehicle step of claim 1, wherein the bracket comprises an elongated bracket body, a plurality of tongues extending from a first side of the bracket body facing to a corresponding door of the vehicle and a plurality of mounting ears extending from a second side of the bracket body away from the corresponding door of the vehicle, the tongues are configured to mount the bracket to the vehicle, the mounting ears are configured to mount the first and second step members and the first and second power mechanisms to the bracket, each of the first and second step members is mounted between two adjacent mounting ears, the first and second power mechanisms are mounted between two adjacent mounting ears.

8. A vehicle step comprising:
   a bracket;
   a transmission shaft having an axis;
   a step member mounted on the bracket via the transmission shaft; and
   a power mechanism electrically connected to the step member and configured to drive the step member to rotate about the axis from a first position to a second position;
   wherein the step member comprises a first step member and a second step member which are separately mounted on the bracket, the power mechanism comprises a first power mechanism electrically connected to the first step member and a second power mechanism electrically connected to the second step member, the first and second power mechanism are located adjacent to each other and between the first step member and the second step member such that the first and second power mechanism are covered by a same enclosure.

9. The vehicle step of claim 8, wherein the power mechanism comprises a motor connected with the transmission shaft and configured to provide power to the transmission shaft.

10. The vehicle step of claim 9, wherein the motor comprises an output shaft; a coupling is provided to connect the transmission shaft and the output shaft, the transmission shaft and the output shaft are coaxial.

11. The vehicle step of claim 8, wherein the transmission shaft comprises a flat key extending through and fixed in the step member.

12. The vehicle step of claim 8, wherein a pair of end sockets are provided on the transmission shaft and located at two lateral sides of the step member.

13. The vehicle step of claim 8, wherein the bracket comprises an elongated bracket body, a plurality of tongues extending from a first side of the bracket body facing to a door of a vehicle and a plurality of mounting ears extending from a second side of the bracket body away from the door of a vehicle, the tongues are configured to mount the bracket to the vehicle, the mounting ears are configured to mount the step member and the power mechanism to the bracket, each of the first and second step members is mounted between two adjacent mounting ears, the first and second power mechanisms are mounted between two adjacent mounting ears.

* * * * *